A. VAN BRUNT.
SUSPENDER BUCKLE.
APPLICATION FILED JULY 30, 1913.
Reissued May 26, 1914. 13,738.
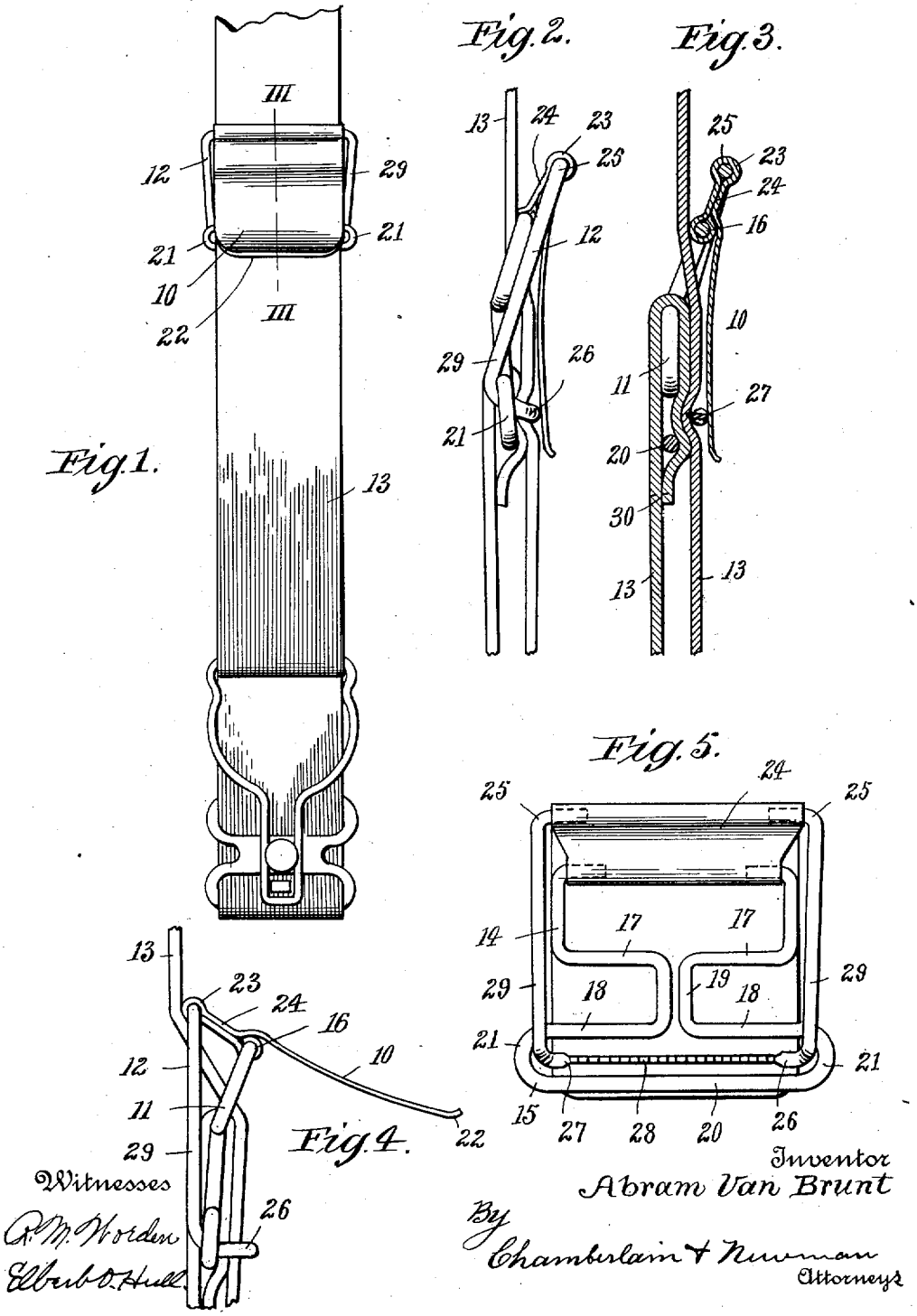
Witnesses
A. M. Worden
Elbert O. Hull
Inventor
Abram Van Brunt
By Chamberlain & Newman
Attorneys

UNITED STATES PATENT OFFICE.

ABRAM VAN BRUNT, OF BROOKLYN, NEW YORK.

SUSPENDER-BUCKLE.

13,738. Specification of Reissued Letters Patent. Reissued May 26, 1914.

Original No. 1,021,018, dated March 26, 1912, Serial No. 586,686. Application for reissue filed July 30, 1913. Serial No. 782,133.

*To all whom it may concern:*

Be it known that I, ABRAM VAN BRUNT, a citizen of the United States, formerly a resident of Bridgeport, Fairfield county, Connecticut, but now residing at Brooklyn, Kings county, State of New York, have invented certain new and useful Improvements in Suspender-Buckles, of which the following is a full, clear, and exact description.

This invention relates more particularly to what is known as a rustless buckle adapted for use in connection with hose-supporters attached to corsets, and upon suspenders for men.

The primary object of the invention is to provide a simple and efficient buckle which will positively hold and clamp or lock the webbing in such a way that adjustment may be readily secured and at the same time to construct a buckle in which the back or part nearest the wearer will be covered by the webbing thus preventing the metal parts of the buckle from being affected by perspiration or moisture which is likely to cause the same to become rusted or otherwise objectionable, and which buckle is so constructed that it will overcome many of the objections incident to devices of this kind as ordinarily constructed.

Other objects of the invention are to provide a buckle in which the webbing may be passed therethrough in a novel manner; to provide a clamping or locking-member having a clamping-bar which is adapted to coact with a frame-member having a clamping bar in holding the webbing; to provide a buckle which may be readily and cheaply made and assembled, and to provide a buckle which may be used for various purposes.

A further object of the invention is to provide a buckle in which the frame member will properly support the webbing and which also serves as a part of the means for locking the webbing against movement.

A still further object of the invention is to provide a buckle which will lie substantially flat when in use and in which various widths and thicknesses of webbing may be used.

With these and other objects in view, the invention will be hereinafter more particularly described with reference to the accompanying drawings, which form a part of this specification, and will then be pointed out in the claims at the end of the description.

In the drawings, Figure 1 is a front elevation of one form of buckle embodying my invention showing the same applied to a supporter. Fig. 2 is an enlarged side elevation showing the parts in their holding position. Fig. 3 is a vertical section, taken on line 3—3 of Fig. 1. Fig. 4 is a side elevation showing the parts of the buckle in their released or unlocked position; and Fig. 5 is a rear elevation of the buckle.

A buckle constructed in accordance with my invention may be of any suitable material, and as shown it comprises a lever member 10, a frame or frame-member 11, and a locking or gripping member 12. The frame-member 11 is substantially I-shaped in form and is substantially the width of the webbing 13, and said member has a loop portion 14 and another loop portion 15 somewhat wider though shorter than the first mentioned loop portion 14 and may be slightly wider than the webbing. The frame-member may be of wire having its ends pivotally held in the socket portion 16 of the lever-member 10 and about which the said lever-member is adapted to move upon the frame-member as upon a pivot. The frame-member has its loop portion 14 formed by bending the sides of the frame inward toward the center to provide horizontal portions 17 of the loop 14, and the horizontal portions 18 of the loop 15 which are joined by the vertical parts or stem 19, the said parts 18 forming a continuation of the horizontally-arranged bar or rod 20 which extends outward beyond the lever-member 10 and the webbing to form curved parts 21 to form a narrow elongated eye.

The lever-member 10 may be of sheet metal as copper brass or other material, and has its finger portion provided with a lip or lower end 22 extending somewhat below the rod 20 of the frame-member to adapt the said lever-member to be readily raised or moved on its pivot, and said member is bent or formed to provide the socket portion 16 and a socket portion 23 located above the portion 16. These two socket portions may be made by bending the flat metallic body of the lever-member to form a straight joining eccentric or crank portion 24 between said socket portions, and in the socket portion 23 of the lever-member are held the ends 25 of the locking-member 12. By holding the locking-member to the crank or eccentric portion of the lever member, the said locking member may be given a relative movement with respect to the frame-member and this movement will serve to draw the webbing toward the loop portion 15 in a manner to be presently described.

A lip or engaging part 26 is formed as a part of the locking-member 12, and this engaging portion is in the form of a bar which may be made by flattening a portion of the locking-member while forming the same so as to make a bar-like body or rod 27 on one edge of which may be formed in any suitable way the teeth 28. The locking-member is substantially rectangular in form and has side arms 29 extending upwardly and terminating in the ends 25 which serve as a pivoting means for said locking-member. The lip or engaging portion 26 extends angularly and may be formed at substantially right angles to the main body of the locking member and is adapted to project or extend through the loop 15 of the frame member to provide an opening through which the webbing 13 may pass. As will be seen the fixed end of the webbing is passed upward back of the frame-member and through the loop 14 of the same and downward over the front face of the lower portion thereof and may be fastened by stitching or otherwise, as at 30, and as shown in Fig. 3. The free end or running portion of the webbing may form a loop as is usual and is passed upward back of the bar 27 and between the same and the lower portion of the frame-member including its bar 18, then rearward through the loop 14 upward and to the rear of the upper portion of the locking-member, thus entirely covering the rear part of the buckle by the webbing to prevent the metal of the buckle from becoming rusted, the upper end of said webbing being fastened to the corset in the usual way.

If the parts are in the position shown in Fig. 4, the webbing 13 may be adjusted as there is no drawing or locking effect of the parts, but as soon as the lever-member 10 is moved to the position shown in Figs. 1 to 3, the member 12 will be drawn upward owing to the eccentric movement of the upper part of the lever-member and this will draw the lip 26 inward and upward and during this movement the webbing will be drawn back and forced against the loop 15 of the frame member, thus holding the webbing against movement until the locking-member is again released, the said locking-member having its teeth 28 extending inward so as to engage the body of the webbing and thus serving to further hold the webbing against movement when the members are in a locked position.

It will be understood that the teeth 28 may be dispensed with and that the frame may be so porportioned that the lip of the locking-member in drawing the webbing against the loop will serve as a positive locking means for the webbing, and that by having the frame-member constructed in the manner shown, it forms a substantial support for the webbing.

From the foregoing it will be seen that a simple and efficient buckle is provided in which the entire rear exposure thereof is covered by the webbing so as to produce what is known as a rustless buckle; that said buckle may be easily constructed and assembled; that various widths and thicknesses of webbing may be used with a buckle of the character described; that a positive hold and lock is provided for the webbing which may be readily released to permit the webbing to be adjusted; that said buckle will lie substantially flat when in use; and that the relative movement of the clamping and frame-members of my improved buckle serves to cause their continguous horizontal bars at their lower ends to co-act in clamping and holding the intermediate or running portion of the webbing when the lever-member of the buckle is swung into its closed position.

It will be noted that the respective wire or body-members of the buckle are in reality clamping-members and function as such, though for convenience they have been distinguished one from the other by the terms, "frame-member" and "clamping-member." It is also to be noted that both of these two clamping-members are made in one piece and are inarticulate in the sense that they have no joints, being virtually rigid except for what spring they may have on account of the elasticity of the material of which they are made.

Having thus described my invention, I claim as new and desire to secure by Letters Patent:—

1. A buckle comprising a frame member having two looped portions one of which is adapted to receive the webbing, a substantially rectangular locking member having a lip adapted to project within the other of the loop portions of the frame member and to receive the webbing, and a lever member pivotally held to the frame member and connected to the locking member to cause the same to have an inward and upward movement to draw and force the webbing within the loop of the frame member through which the lip passes.

2. A buckle comprising a frame member having a narrow elongated eye portion at one end, a lever having its intermediate part hinged to the other end of the frame, and a locking member having a loop portion projecting through the said eye of the frame member, the locking member being hinged to one end of the lever whereby upon swinging the lever on the frame the loop will be drawn back in the eye to cause a band of fabric to be pressed against the margins of the eye and locked by the loop portion.

3. In a three-piece rustless buckle, the combination with a one-piece frame-member having a horizontal clamping-bar at its lower end, of a one-piece clamping-member having a horizontal clamping-bar at its lower end, both of the said members being structurally rigid and the lower end of one being wider than the lower end of the other and formed to permit one to pass through the other for positioning their respective clamping-bars in clamping relation, and a one-piece sheet-metal lever-member having eccentric pivotal connection directly with the upper ends of the said one-piece frame and clamping members, and the said lever-member when in its closed position shutting down in front of the said bars.

4. In a three-piece rustless buckle, the combination with a one-piece frame-member having a horizontal clamping-bar at its lower end, of a one-piece clamping-member having a horizontal clamping-bar at its lower end, the lower end of the frame-member being wider than the lower end of the clamping-member and formed to permit the latter to pass through the former for positioning their respective clamping-bars in clamping relation, and a one-piece lever member having eccentric pivotal connection directly with the upper ends of the said one-piece frame and clamping members, and when in its closed position shutting down in front of the said bars.

5. In a rustless buckle, the combination with a one-piece wire frame member having a horizontal clamping-bar at its lower end, of a one-piece wire clamping-member having a horizontal clamping-bar at its lower end and in itself rigid, the lower ends of the said members being slidably interlocked to insure the co-action of the clamping-bars of the two members to hold the webbing, and a lever-member having eccentric pivotal engagement with the upper ends of the said frame and clamping-members for the operation thereof and when in its closed position shutting down in front of the said bars.

6. In a rustless buckle, the combination with two clamping-bar members in themselves rigid and having parallel horizontal clamping-bars at their lower ends which have sliding interlocking engagement to insure the co-action of the said bars, of a lever-member having eccentric pivotal connection with the upper ends of the said members for the operation thereof and when in its closed position shutting down in front of the said bars.

7. In a rustless buckle, the combination with two clamping-bar members of unequal length, in themselves rigid and having parallel horizontal co-acting clamping-bars located at their lower ends which have sliding interlocking engagement to insure the co-action of the said bars, and a lever-member having eccentric pivotal connection with the upper ends of the said clamping-bar members and when in its closed position shutting down in front of the said bars.

Signed at Bridgeport in the county of Fairfield and State of Connecticut this 23rd day of July, A. D. 1913.

ABRAM VAN BRUNT.

Witnesses:
C. M. Newman,
Ruth M. Worden.

Copies of this patent may be obtained for five cents each, by addressing the "Commissioner of Patents, Washington, D. C."